(12) United States Patent
Álvarez Montaner

(10) Patent No.: US 10,201,721 B2
(45) Date of Patent: Feb. 12, 2019

(54) FIRE EXTINGUISHING DEVICE FOR IN-AIR USE

(71) Applicant: Lluís Álvarez Montaner, Castellas del Vallès (ES)

(72) Inventor: Lluís Álvarez Montaner, Castellas del Vallès (ES)

( * ) Notice: Subject to any disclaimer, the term of this patent is extended or adjusted under 35 U.S.C. 154(b) by 0 days.

(21) Appl. No.: 15/125,416

(22) PCT Filed: Mar. 12, 2015

(86) PCT No.: PCT/ES2015/000032
§ 371 (c)(1),
(2) Date: Sep. 12, 2016

(87) PCT Pub. No.: WO2015/136128
PCT Pub. Date: Sep. 17, 2015

(65) Prior Publication Data
US 2017/0072234 A1    Mar. 16, 2017

(30) Foreign Application Priority Data

Mar. 13, 2014   (ES) .................................. 201400202

(51) Int. Cl.
*A62C 3/02*     (2006.01)
*B64D 1/16*     (2006.01)
*A62C 5/02*     (2006.01)

(52) U.S. Cl.
CPC .............. *A62C 3/0235* (2013.01); *A62C 5/02* (2013.01); *B64D 1/16* (2013.01)

(58) Field of Classification Search
CPC ....... A62C 3/0228; A62C 3/0235; A62C 5/02; B64D 1/16; B64D 1/18
(Continued)

(56) References Cited

U.S. PATENT DOCUMENTS 3,688,952 A * 9/1972 Barlow .................... B64D 1/16
                                                          222/333
4,240,507 A   12/1980 Hokkanen
(Continued)

FOREIGN PATENT DOCUMENTS

CA    2 289 601 A1   11/1998
DE    33 15 945 A1   11/1984
(Continued)

OTHER PUBLICATIONS

International Search Report Corresponding to PCT/ES2015/000032 dated May 5, 2015.
(Continued)

*Primary Examiner* — Christopher Kim
(74) *Attorney, Agent, or Firm* — Davis & Bujold PLLC; Michael J. Bujold

(57) ABSTRACT

A fire-extinguisher device, for aerial use, comprising a bucket which contains two independent but related tanks or cylinders, one for water and one for a foaming agent mixture, along with a chamber in which the extinguishing foam is generated. The device is also equipped with an electronic mechanism to control operation thereof, as well as mechanism for the dispensing of the extinguishing foam that is produced, and which will allow for rapid dropping or spreading over an extended area, as well as providing various discretionary dispensing services.

13 Claims, 2 Drawing Sheets

(58) Field of Classification Search
USPC .............................. 169/52, 53, 34; 239/171
See application file for complete search history.

(56) References Cited

U.S. PATENT DOCUMENTS

| | | | |
|---|---|---|---|
| 4,601,345 A | 7/1986 | Mahrt | |
| 8,356,676 B2 | 1/2013 | Casals | |
| 2012/0222874 A1* | 9/2012 | Toeckes | A62C 3/08 |
| | | | 169/53 |

FOREIGN PATENT DOCUMENTS

| | | |
|---|---|---|
| ES | 0419040 | 5/1975 |
| ES | 2 320 845 A1 | 5/2009 |
| SU | 896850 A1 | 7/1991 |
| WO | 94/23797 A1 | 10/1994 |
| WO | 94/28975 A1 | 12/1994 |
| WO | 98/52647 A1 | 11/1998 |

OTHER PUBLICATIONS

Written Opinion Corresponding to PCT/ES2015/000032 dated May 5, 2015.

* cited by examiner

FIRE EXTINGUISHING DEVICE FOR IN-AIR USE

FIELD OF THE INVENTION

The invention describes a device for the extinguishing of fires, which is suitable for being carried by helicopter and filling with water externally from tanks, swimming pools, rivers and lakes, etc.; with the novel feature that it has been provided with the optimised means for both filling with water and the production of fire-fighting foam by a fire-extinguishing foam cannon.

BACKGROUND TO THE INVENTION

Forest fires are the cause of the ruination of our woodlands, destroying not only landscapes and ecosystems, which take a long time to recover, but also ruining the wealth of different kinds of wood, the forestry industry, destroying or damaging crops and buildings, and provoking casualties that affect both people and animals.

In order to respond to these fires a multiplicity of efforts have been made, not solely to prevent them but fundamentally to put them out once they have started. Thus, at the present time, the rapid extinguishing of such fires has become a priority.

These days, along with the participation in the work of extinguishing fires by squads of firemen and other persons who fight the fire on the ground, extensive advantage is also taken of the use of planes and helicopters that, because of their unrestricted movement can reach parts of the fire that would otherwise be inaccessible, or wooded areas that the ground squads would take time to reach, or perhaps would not be able to reach. In short, planes and helicopters benefit from the speed with which they can cover distances and also from their capacity to carry and deliver large quantities of water to determined points. In this sense, helicopters are preferred to planes or hydroplanes, due to the fact that they can refill with water from a wider range of locations.

The usual procedure for refilling a helicopter with water is to hang a bucket from it, suspended from the helicopter's cargo hook, then submerge the bucket in a lake, for example, and when it is full to takeoff with the load of water hanging below.

Subsequently, in order to drop the water from this bucket onto the chosen area, the pilot will take up a position above that area and open the bucket release valve, allowing the water to fall, by gravity, onto the fire. The inconvenience of this method is that all of the water is released in one drop, with the result that it is not very effective. In many cases this means that the helicopter will have to return to a determined area various times to make successive drops, in order to correct deviations during the water drop, caused by wind, turbulence, etc.

Moreover, following a first drop, residual areas frequently remain that were not reached by the water, or residual focuses of fire that need to be attacked again. To do so it is necessary, using the previously known technique, for the aircraft to pass over the same area various times, which represents an excessive waste of time.

Moreover, it must also be taken into account that, on occasions and due to the high temperatures produced by these fires, the water may even be vaporised before it can reach the ground, rendering it ineffective for purposes of extinguishment.

For the above reason, it has been found to be much more effective for the water to be combined with flame retardant or inhibiting substances. On the one hand this avoids vaporisation of the water while, on the other, it allows for fire inhibiting films to be applied to flammable objects that need to be protected, such as trees or buildings.

In addition, the formation of an extinguishing mixture, using the same quantity of water, will ensure that far more product is obtained, to be dropped on the fire, and, as mentioned above, a far more effective product.

To this end, provision must be made for the mixing of the fire-fighting composite while, at the same time, while simultaneously maintaining the capacity, in a device such as the present invention, for refilling with water.

Spanish patent no. 0419040, to Alexander Linkewich, disclosed the production of a fire-fighting paste, produced by adding water to fire-retardant products, such as ammonium sulphate mixed with clay and a binding agent. Given that the loading of this paste has to be done on the ground, the patent proposes filling the tanks of the aircraft with this fire-retardant product, subsequently filling the bucket with water, and mixing the two together en route.

The drawback of this system is that it is very difficult to maintain the mixture in optimum conditions for use. To this end a complex ground and aerial infrastructure is required, given that the mixture is in need of constant stirring/agitation.

U.S. Pat. No. 4,240,507, to Hokkanen, discloses a cistern, for aerial use. This bucket has one or more openings at the bottom to allow for filling, which are closed by means of a gate. The additive to be mixed with the water is then contained in another cistern. The apparatus includes a mechanism that controls the mixing of the additive with the water by means of two valves, dependent on the stroke of a piston, in such a way that it will, in one case, mix water with an additive and, in another, will release the mixture onto the fire. Finally, it will also return any excess and unused additive to its storage cistern.

U.S. Pat. No. 4,601,345, to Mahrt, discloses a device to mix and supply an extinguishing mixture, made up of water and a fire retardant agent in a tank or cistern. Equipped with a tank, containing the fire-retardant substance, located within the structure of the apparatus itself, plus another cistern containing water, suspended in the air. Using an injection pump the retardant substance is then transferred from one tank to the other to be mixed with the water, which is filled using conventional methods. The rotation of a propeller fixed to the end of the injection lance serves as a stirrer/agitator, which serves to speed up the mixing process.

PCT Patent No. WO94/28975, to As LuftTransport, discloses a tank to be used for an extinguishing mixture, to which is fitted the means to avoid the rotation of the module and to allow the pilot to control operation by means of radio communications. It is also fitted with a device that, along with a device that, by means of a cone that can be moved at the pilot's discretion, controls the strength of the mixture, allowing for discrete dosage of the quantity of the mixture poured in. Dosage is gravity based and the retardant substance is added directly to the bottom of the tank, or bucket, so that the mixing with the water is carried out on the basis of mutual contact.

Unfortunately, all of the above mentioned patents fail to provide an efficient and effective way of producing fire-fighting foam, insofar as the production of such foam requires that it be mixed with air. Mixing fire-retardant paste directly with water requires quite a lot of time for the additive to become adequately blended in, while agitating or stirring the water is an ineffective solution, as alternatively is expecting that, during the drop of the mixture onto the fire, sufficient time will have passed for the foam to fully form, due to the mixture coming into contact with the air.

The negative consequence of this are that the extinguishing mix dropped onto the fire is deficient and, moreover, considerable time needs to be spent making up the proposed mixture.

Furthermore, as discharging times are very short, extinguishing is limited to the area of impact.

PCT Patent No. WO9423797, to Baker R., discloses a tank that supplies foam for the extinguishing of fires by using bottled compressed air, the pressure of which allows for the spraying of the foam mixture through a series of nozzles controlled by valves, which spray the foam onto hemispherical aeration screens in order to fully expand it.

However, as this tank requires the use of compressed air maintenance requirements are complicated. Moreover, it also depends on an external source of maintenance, which requires ground assistance for it to be operative. It also lacks the means to ensure the controlled mixing of the foam and water, this being done passively in the hold of the tank which is filled on the ground. As there is no automatic and successive loading of the water, the extinguishing performance of the tank decreases notably. In addition, the dropping of the foam is practically gravity driven, insofar as a sufficient impulse is not generated to activate the foaming.

Thus we can see that, in the systems that are known to date, the dropping of the water is only by means of gravity, and despite the fact that foaming elements are mixed in and aeration of the foaming agent does occur during the drop, these systems are not very effective.

Furthermore, the foam produced is neither homogeneous nor fully expanded, which results in important water losses and an inability to take full advantage of all of the advantages that such foam can provide as an extinguishing element.

The device of the present invention, conversely, is not gravity driven but is driven by the pressure of an expulsion pump that sprays out the fire-extinguishing substance, and this means that it can be used with discretion and in successive applications, in this way rectifying the disadvantages mentioned above.

The foam is discharged at a determined pressure, completely expanded and homogeneous, with the result that an extinguishing product is obtained that is more effective and that provides a higher level of mixture performance.

A further and additional advantage is that the new device uses much less water than conventional devices do, decreasing the load that needs to be carried by the aircraft, improving handling, and allowing the aircraft to fly at reduced speeds, or even at hover, ensuring much more precise and effective fire-extinguishing.

BRIEF DESCRIPTION OF THE INVENTION

The present invention has been designed to respond to these problems, disclosing a fire-extinguishing device for use with helicopters, which includes an extinguishing-foam cannon, consisting of a foam expansion chamber that receives a foaming mixture made up of water and a fire-extinguishing foaming-agent, at a determined pressure and level of flow, from a nozzle that disperses a jet of the finished foam through injectors of this mixture, combining the said mixture with air in the said expansion chamber until it is sprayed out, under pressure, through an aerator screen, forming the fully expanded and homogeneous extinguishing-foam.

The present invention is designed to be incorporated to buckets, or tanks, of the type that are suspended from a sling, and made of steel, textile, etc.

These buckets are fitted with independent tanks to hold both water and the foaming agent, with the tank for the latter preferably being located in the bottom part of the bucket, in order to provide stability to the assembly as a whole and to lower its centre of gravity; as well as a motor module, housing a motor used to drive a suction pump that will draw in the water or disperse the foaming-agent under pressure; plus a foaming-agent injection and dosage system, such as the one consisting of a pressure and calibrated flow pump that is connected up either to the water pump or directly to the water tank, in order to generate a foam solution with the right proportions; plus flow direction valves that allow for the selection of the filling function or injection of the foaming solution, along with the corresponding control electronics.

BRIEF EXPLANATION OF THE DRAWINGS

Below, in order to provide a better interpretation of the object of the invention, inter alia and by way of example but not restricted thereto, we attach descriptions of various examples of practical embodiments, accompanied by the corresponding drawings.

FIG. 4 shows a representation of a helicopter with a device, in accordance with the invention, refilling from a body of water, such as a lake, pond, or similar.

DETAILED DESCRIPTION OF THE PREFERRED EMBODIMENT

Figure 1:
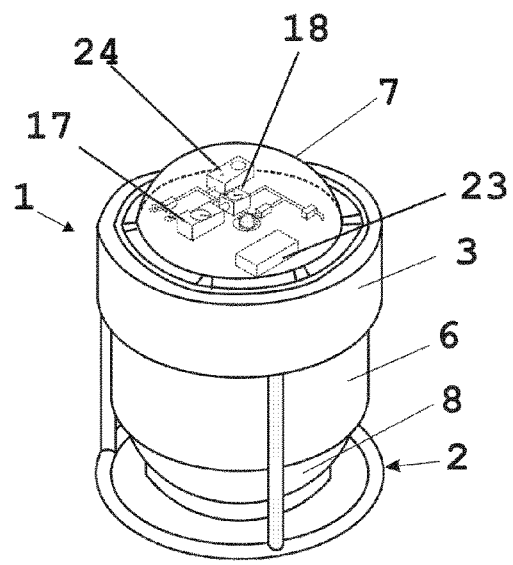
FIG. 1 shows a representation of a bucket, according to the invention, identifying the parts that make it up.
Figure 2:
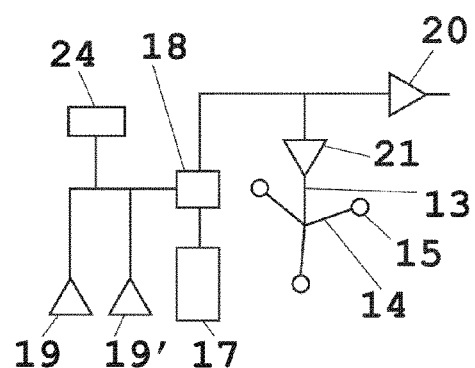
FIG. 2 is a schematic representation of the motor module, which is placed at the top of the bucket shown in FIG. 1.
Figure 3:
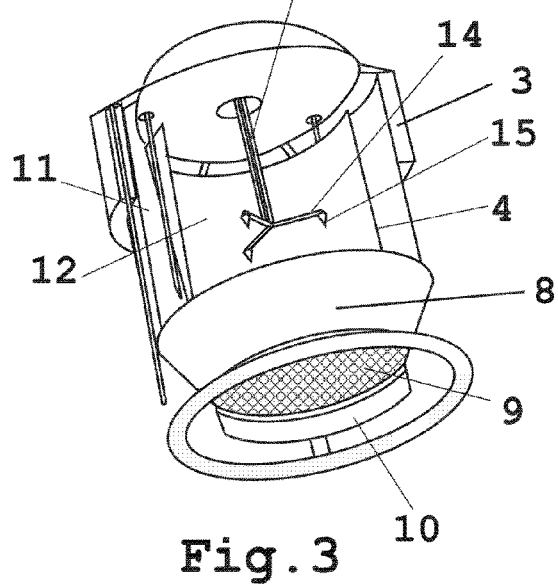
FIG. 3 is a simplified, schematic representation of the foam generating cannon incorporated to the invention.
Figure 4:
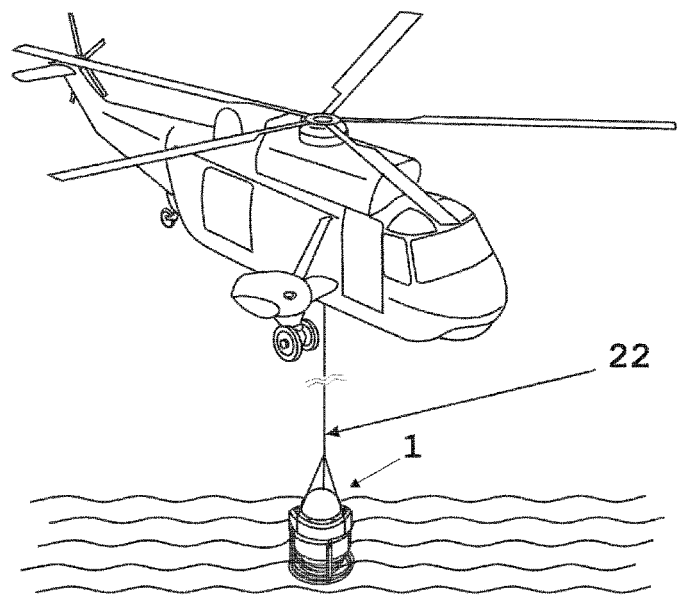
Figure 5:
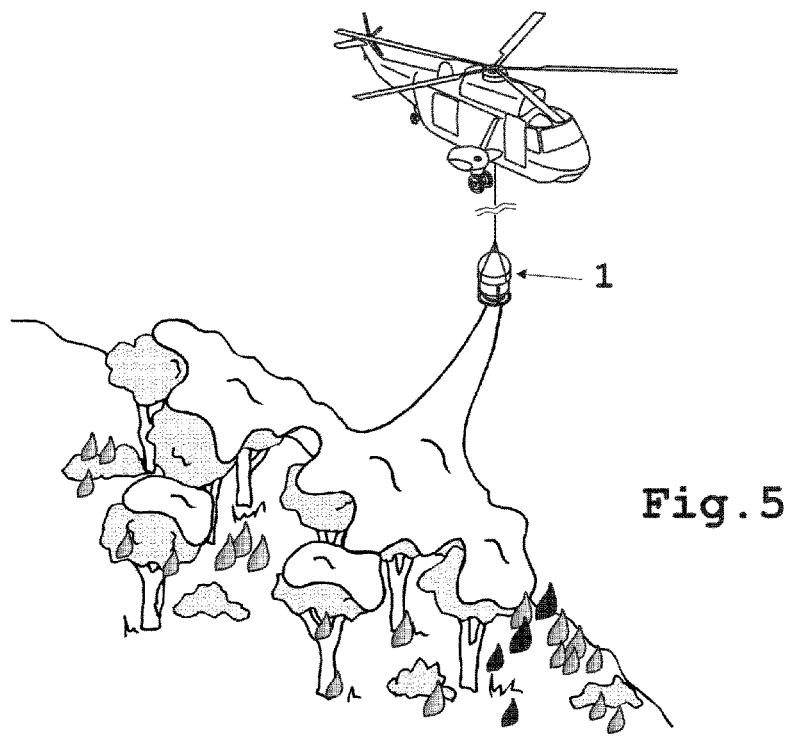
FIG. 5 shows a representation of the same helicopter, as in the previous figure, dropping the load of homogeneous and expanded foam obtained in accordance with the invention.

The invention consists of a fire extinguisher for aerial use that incorporates an extinguishing-foam generating cannon, consisting of an expansion chamber (12) for the entry of air that receives the mixture of foaming and extinguisher from the injectors (15) of the foam jet dispersal nozzle (14), with the said foam mixture being dispersed under pressure, enabling it to be mixed fully with the air before dispersal to the exterior through an aerator screen (9), thus obtaining an extinguishing foam that is fully expanded and homogeneous.

The bucket (1) inside which the foam generating cannon is found, is fitted with an independent tank for the water (11) and a motor module (7) inside which the motor unit (17) is located, along with the water suction pump (18), the foaming agent injection and dosage system (24), along with the corresponding flow direction valves (19, 19', 20 and 21), which control the flow of the liquids, as well as the control electronics (23). The tank for the foaming agent may likewise be located inside the bucket (1) or in its own tank, for example attached to the bottom, or in a tank attached to either the helicopter itself or the sling.

The device of the invention, which is designed to be used by helicopters, consists of a bucket (1), fitted with a supporting stand (2) or landing gear, which may consist of a tube of resistant material, such as aluminium alloy, in the form of a ring, or of a reinforcement fitted to the bottom of the bucket that acts as a supporting stand, insofar as this structure will serve to support the said bucket assembly (1) either on the ground or resting on the bottom at the water refilling point.

The body of this bucket (1) is made up of a cylindrical element (6) finished at the top with a floating element (3), which keeps the motor module out of the water, and at the bottom by an outlet (10), which is fitted with an aerator screen (9), through which the extinguishing material is dispensed. In some embodiments the diameter of this cylinder (6) may be gradually narrowed towards the bottom (8).

The interior of the tank, towards the top, as shown in the drawings that accompany the invention, is partially open and in contact with the air, which facilitates the process of filling the bucket (1) when immersed in water and the aeration of the extinguishing mixture.

The aeration screen (9) consists of a stretched mesh screen structure through which the jet of foaming agent is dispersed to the exterior.

Inside this cylinder (6) there is another cylindrical body (4), which is open at both ends, top and bottom. The exterior perimeter of this cylinder (4) annularly delimits the water tank (11), and internally the foam cannon, consisting of an expansion chamber (12), in which there are inlets for the air, not shown, and the foam (13), the latter ending in a dispensing nozzle (14) for the jet of foam, the ends of which are fitted with injectors (15) that spray out the foaming substance, under pressure, through the aerator screen (9).

In those embodiments that so require, the use of a floating element (3) has also been anticipated, consisting of an air chamber and/or light and highly flotable material that will serve to prevent the immersion of the motor module in the water when refilling the tank from a lake, river, reservoir, etc., in those cases where the supporting stand (2) does not touch bottom.

The motor module (7) consists of a motor unit (17) that drives the water pump (18), which serves both to draw the water from the water tank (11) and dispense the foam, i.e. the mixture of water and foaming agent, under pressure. Likewise, in those cases where the device cannot be refilled by means of immersion, due to the lack of depth of water at the filling point, this pump can also be used to draw in the water, through a vertical pipe, not shown here, in order to refill the tank with water (11).

There is a system (24) for the injection and dosage foaming agent system, which consists of a pump with a calibrated flow designed to provide the foaming solution with the right proportions; flow direction valves (19, 19', 20 and 21), to select the filling or foaming solution injecting function; as well as the corresponding control electronics (23).

The preferred method for refilling the present device with water is by direct immersion in a body of water. In order for this refilling to take place in a straightforward and rapid way the device has been designed as a hollow cylinder with an annular tank built round the foam generating cannon, so that, as established by the Archimedes Principle, by decreasing the volume of a body that is submerged in a fluid, we decrease the hydrostatic push that keeps that body afloat, allowing the device to easily penetrate the surface of the water. Through the same cannon the water will then spill out through its upper opening, filling the deposit with water (11) in a rapid immersion operation, up to the float line.

The aeration screen (9) also serves to prevent any solid bodies entering into the water tank (11).

The invention device functions as follows:

At the helicopter base, the foaming agent reserve chamber is filled with foaming agent. When an emergency call is received to attend to the extinguishing of a fire, the filling bucket is immediately hooked up to the helicopter by means of a supporting cable (22) while the control wiring is also connected up. The equipment is then tested and the helicopter takes off, heading for the location of the fire, although if it has not already done so it must first fill up with water, so that it will be able to attack the fire.

When filling the water tank (11) the invention anticipates a number of different procedures.

EXAMPLE 1

The tank may be filled by means of direct immersion in the sea, lakes, rivers, reservoirs, etc., wherever there is sufficient depth.

This procedure is typical of the present invention and one of the advantageous consequences of its constructive disposition is that it permits a rapid filling of the water tank (11), reducing refilling times, avoiding aircraft having to queue up at water filling points and increasing the interval of drops onto the fire.

EXAMPLE 2

The tank can be lowered into a river, reservoir or any other shallow water deposit, resting on its stand (2) or landing gear. As the tank cannot be filled with water in these cases by immersion, the water suction pump (18) starts up, driven by the motor unit (17), until the water tank (11) has been filled. In this case the valves (19 and 20) control the entry of the water.

EXAMPLE 3

The tank can also be lowered to the ground, where teams of fireman can fill it with water from their hoses via the auxiliary water input, not shown here.

The helicopter is then in condition to attack the fire and will lift off and approach the fire area, where it will provide pressure to set off the production of foam by the foam cannon, mixing the foaming-agent with the air and dispersing it under pressure through the aeration screen (9), generating an extinguishing-foam that is completely homogeneous and fully expanded.

The proportion of the extinguishing mixture is highly efficient, in the sense that a great deal of foam is generated using only small quantities of foaming agent. Water usage is also more economic, allowing for more extensive expanses of terrain to be covered using the same amount of water in the tanks than is the case when the foaming mixture is not used.

In order to facilitate the production of foam the present invention is provided with a foam cannon, consisting of an expansion chamber (12) with an air inlet, in which the foaming mixture is sprayed through injectors (15) located at the ends of a foaming jet dispersing nozzle (14), which is connected to the foam inlet (13). The jet of foam is then dispersed by means of a gyrating movement, which enables it to mix with the air, due to the presence of directional vanes, not shown here.

The foaming agent is dispersed under pressure onto the aeration screen (9), which ensures the emergence to the exterior of a homogeneous and fully expanded foam, through the outlet (10).

The aerator screen (9) is based on a stretched mesh screen structure, against which a jet of foaming agent is dispersed under high pressure, and which generates a homogeneous and fully expanded extinguishing foam.

In addition there is also another way of dispersing the extinguishing substance, an alternative to the use of the foam cannon described above, which is based on a rapid water discharge system. This system serves a dual purpose, firstly as a means of emergency discharge, should the helicopter need to rapidly dump its load, and secondly, if there is a malfunction of the motor unit (17), allowing the bucket to operate along the lines of the previously known art, i.e. by means of gravity.

The tank is transported, suspended from the helicopter's cargo line and hook, using a sling (22). The use of a long line is preferable, insofar as it allows the pilot to have a vertical reference with regard to the points at which he wishes to attack the fire, and also because it means that the pilot can keep the helicopter at a sufficient distance from both the fire and the refill points.

The length of this sling (22) is also important as it avoids the downdraft produced by the blades of the helicopter rotor from fanning the flames.

An electrical cable or wireless system, not shown here, attached to the sling (22) connects the electronic control systems of the bucket (1) to the pilot's controls in the cabin of the helicopter.

It must also be taken into account that, depending on the type and intensity of the fire, the pilot will be able to choose between discharging the load at maximum flow, for greater penetration, or at a lower level of flow and with increased output speed, for better coverage. This aspect can be controlled by the flow selector on the control panel, which modifies the rate of flow, and the pressure of the water dispersed by the injectors, acting on the rpm of the motor unit (17) and through the variation of the number of intervening injector jets. Selection is by means of a selector valve that distributes the water through the injectors.

It is understood in the present case that such details as do not alter or modify the essence of the present invention will be considered as variations thereof.

The invention claimed is:

1. A fire-extinguisher device for aerial use, the fire-extinguisher device containing an extinguishing agent made of foam concentrate and water, or water and a fire retardant, or water, and the fire-extinguisher device which facilitates dispersal of the extinguishing agent from the fire-extinguisher device, wherein the fire-extinguisher device comprises:
   a cylindrical body (6) and an interior cylinder (4),
   the interior cylinder (4) is open at a top and a bottom thereof,
   a water tank (11) that is formed within the fire-extinguisher device (1) between cylindrical body (6) and the interior cylinder (4),
   the water tank (11) that is accessible through the top of the interior cylinder (4) to facilitate filling of the water tank (11), and an internal space of the interior cylinder (4) acts as an expansion chamber (12), during dispensing of the extinguishing agent, and as a water inlet when refilling the water tank (11) by immersion; and
   at least one agitation nozzle (14) that dispenses the extinguishing agent, under pressure supplied by a pump (18), into the expansion chamber (12) for dispersal of the extinguishing agent through an outlet of the fire-extinguisher device.

2. The fire-extinguisher device for aerial use according to claim 1, wherein a bottom (10) of the expansion chamber (12) of the fire-extinguisher device is equipped with an aerator screen (9).

3. The fire-extinguisher device for aerial use according to claim 2, wherein the aerator screen (9) comprises a stretched mesh structure.

4. The fire-extinguisher device for aerial use according to claim 1, wherein the agitation nozzles use injectors (15) which facilitate production of the extinguishing agent.

5. The fire-extinguisher device for aerial use according to claim 1, wherein the fire-extinguisher device (1) further includes a supporting stand (2) for supporting the fire-extinguisher device (1).

6. The fire-extinguisher device for aerial use according to claim 1, wherein a motor module (7) is supported adjacent a top of the fire-extinguisher device (1).

7. The fire-extinguisher device for aerial use according to claim 1, wherein the fire-extinguisher device (1) is equipped with a floating element (3) which is designed to provide floatation for the fire-extinguisher device (1) and prevent immersion of a motor module (7), of the fire-extinguisher device, when lowered into water.

8. The fire-extinguisher device for aerial use according to claim 1, wherein one technique to fill the fire-extinguisher device with water comprises one or more ducts which transfer water drawn by at least one delivery pump (18), which is/are driven by a motor unit (17), to fill the water tank (11), under control of valves (19 and 20).

9. The fire-extinguisher device for aerial use according to claim 1, wherein a foaming concentrate tank, which accommodates a foam concentrate, is located adjacent a lower part of the fire-extinguisher device (1).

10. The fire-extinguisher device for aerial use according to claim 1, wherein a foam concentrate tank, which accommodates a foam concentrate, is in a tank attached to a helicopter.

11. The fire-extinguisher device for aerial use according to claim 1, wherein means for controlling dispersal of the extinguishing agent comprises regulating a flow selector for adjusting an input to a pump (18) which disperses the extinguishing agent at a given pressure and rate of flow.

12. The fire-extinguisher device for aerial use according to claim 1, wherein said fire-extinguisher device (1) is carried by a sling (22), and the sling (22) has a length that is suitable for allowing the pilot to have a view of the fire-extinguisher device (1) during use thereof.

13. The fire-extinguisher device for aerial use according to claim 1, wherein a diameter of the cylinder (6) gradually narrows towards a bottom (8) of the fire-extinguisher device (1).

* * * * *